(12) United States Patent
Hamada (10) Patent No.: US 8,184,659 B2
(45) Date of Patent: May 22, 2012

(54) NETWORK SYSTEM FOR COMMUNICATING BETWEEN DIFFERENT IP VERSIONS WITH MULTIPLE TRANSLATORS

(75) Inventor: Tsuneo Hamada, Saitama (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 121 days.

(21) Appl. No.: 12/453,265

(22) Filed: May 5, 2009

(65) Prior Publication Data

US 2009/0304026 A1   Dec. 10, 2009

(30) Foreign Application Priority Data

Jun. 6, 2008   (JP) ................. 2008-148821

(51) Int. Cl.
*H04J 3/16*   (2006.01)
*G06F 15/16*   (2006.01)

(52) U.S. Cl. ........ 370/466; 370/392; 370/401; 370/352; 370/328; 370/464; 709/230; 709/245; 709/225; 709/217; 709/223

(58) Field of Classification Search .................. 370/466, 370/392, 401, 352, 328, 464; 709/230, 245, 709/225, 217, 227, 235, 220, 223, 238
See application file for complete search history.

(56) References Cited

U.S. PATENT DOCUMENTS

| | | | |
|---|---|---|---|
| 7,308,495 B2* | 12/2007 | Ishiyama et al. | 709/223 |
| 7,443,880 B2* | 10/2008 | Wetterwald et al. | 370/466 |
| 2006/0045076 A1* | 3/2006 | Lim | 370/352 |

* cited by examiner

*Primary Examiner* — Kwang B Yao
*Assistant Examiner* — Jamal Javaid
(74) *Attorney, Agent, or Firm* — Rabin & Berdo, P.C.

(57) ABSTRACT

In a telecommunications network system in which two translators are placed for the conversion of IP version 4 (IPv4)-version 6 (IPv6)-IPv4, one translator converts an IPv4 packet to an IPv6 packet by adding a prefix obtained from a prefix management server managing prefixes to an address contained in an IPv4 packet received from an IPv4 terminal and also converts an IPx6 packet to an IPv4 packet by removing a prefix from the address contained in the IPx6 packet received from the translator. According to the conversion table, the other translator converts the IPv6 packet received from the one translator to an IPv4 packet and an IPv4 packet received from the IPv4 server to an IPv6 packet, thus enhancing the transfer efficiency in the IPv6-IPv4 conversion network.

10 Claims, 10 Drawing Sheets

NETWORK SYSTEM FOR COMMUNICATING BETWEEN DIFFERENT IP VERSIONS WITH MULTIPLE TRANSLATORS

BACKGROUND OF THE INVENTION

1. Field of the Invention

The present invention relates to a telecommunications network system for communicating between different versions of Internet protocol (IP), and more particularly to a telecommunications network system with multiple translators for converting IP packets between different IP versions.

2. Description of the Background Art

Conventional types of telecommunications network system communicating between different IP versions include one in which an IP Version 4 (IPv4) terminal connectable to an IPv4 server-over an IP Version 6 (IPv6) network. Such a conventional type of telecommunications network system accomplishes-packet transfer by means of, so-called Ipv4-in-IPv6 tunnel connection, which could be called capsuling. The tunnel connection is generally used in access networks for connecting user terminals to an Internet service provider (ISP) network.

In such a conventional type of telecommunications network system, an access network owns a broadband access server (BAS) serving as an IPv4 server, which is connected to ISP networks functioning under IPv4 protocol. Providers in an ISP network provide users with services specific to the network. The broadband access server also includes a subscriber management database, which stores subscriber identifications (IDs) for identifying users and global IP addresses for IPv4 (Gr-v4) corresponding to IPv4 user terminals so as to manage the users, or subscribers, enjoying the services. The broadband access server is also allotted to a global IP address for IPv6 (Gr-v6) for use in connection to the IPv6 access network.

For example, IPv4 user terminals subscribing to IPv4 ISPs different from each other may be connected to an IPv6 access network by means of a network terminal unit (NTU) which is assigned to a Gr-v4 address by the ISP network. Those IPv4 terminals are assigned to private IP addresses for IPv4 (Pr-v4) specific to the terminals. The network terminal units are adapted to convert a Pr-v4 address obtained from an IPv4 terminal connected thereto to a Gr-v4 address for connection to the IPv6 access network to thereby establish a tunnel connection over the IPv6 access network to the broadband access server. More specifically, the Pr-v4 address of an IPv4 terminal is converted to the Gr-v4 address of the network terminal unit, and the Gr-v4 address thus converted is capsuled into a Gr-v6 address, and then tunneled.

In the conventional type of telecommunications network system, however, the user terminals are connected to the ISP network, thus causing capsuling to decrease the effective transfer bandwidth. The capsuling, which adds headers to packets, may cause the packets to exceed the maximum transmission unit (MTU), thus causing fragments, so that the data transfer efficiency of the network is degraded.

Some conventional type of telecommunications network systems similar to what was described above for connecting an IPv4 terminal to an IPv4 terminal over an IPv6 access network, may include network application translators (NATs) provided in a level higher than respective IPv4 ISP networks. In such a type of network system, each network terminal unit has its Pr-v4 address assigned by the ISP network. A tunnel connection is accomplished by converting the Pr-v4 address of an IPv4 terminal to the Pr-v4 address of the network terminal unit, which is in turn capsuled into the Gr-v6 address, which will then be tunneled. The function of the network application translators can support the IPv4 terminals to which only Pr-v4 addresses are assigned by means of the Gr-v4 address which the translators own, thus saving the resources of Gr-v4 addresses. That type of network system also includes a subscriber management database which stores subscriber IDs to identify users and the Pr-v4 addresses of IPv4 terminals corresponding to the users.

In that type of telecommunications network system, the function of the network application units executes an application level gateway (ALG) process of converting the address stored in the payload of packets, e.g. from an IPv4 to an IPv6 address. The load of the ALG processing also degrades the transfer efficiency of the network.

SUMMARY OF THE INVENTION

It is an object of the present invention to provide a telecommunications network system for communicating between different IP versions without deteriorating the transfer efficiency of the network system.

In accordance with the present invention, a telecommunications network system comprises: a user terminal working under a first version of Internet protocol (IP); a server placed on a first IP network working under the first version; a second IP network working under a second version of the Internet protocol to be communicable with the user terminal and the server; a first translator for connecting the user terminal to the second IP network; a second translator for connecting the server to the second IP network; and a prefix manager placed on the second IP network for storing and managing for the user terminal at least a first prefix of a first address of the second version, the first address being assigned to the first translator to which the user terminal is connected, and a second prefix of a second address of the second version in association with the first address, the second address being assigned to the second translator and corresponding to the first IP network. In the network system, the first translator comprises a first converter for attaching the first prefix obtained from the prefix manager to the first address of the user terminal, when acting as a sender, the first address being contained in a first packet of the first version received from the user terminal, and attaching the second prefix obtained from the prefix manager to the first address of the server, when acting as a destination, to thereby convert the first packet to a second packet of the second version. Further in the system, the second translator comprises a second converter for analyzing the second packet received from the first translator to identify the first address corresponding to the first IP network from the second prefix contained in the second packet, and specifying the identified first address as a sender address contained in the first packet to be sent to the server to thereby convert the second packet to the first packet.

In an aspect of the present invention, in the telecommunications network system, the second translator may further comprise a third converter for analyzing the first packet received from the server to identify the second prefix from the first address contained in the first packet and corresponding to the first IP network, adding the identified second prefix to the first address of the server, and specifying the first address containing the identified second prefix as a sender address contained in the first packet to be sent to the first translator to thereby convert the first packet to the second packet. Further in the network system, the first translator may further comprises a forth converter for removing the second prefix contained in the second packet received from the second translator and added to the first address of the server acting as the sender, and removing the first prefix attached to the first address of the user terminal acting as the destination to thereby convert the second packet to the first packet.

Preferably, the first and second versions may be Versions 4 and 6 of the Internet protocol, respectively, thus the network transfer efficiency being enhanced during the conversion between the Versions 4 and 6.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENT

In general, telecommunications network systems communicating between different versions of Internet protocol (IP) may be provided with a translator which converts IP packets between IP Version 6 (IPv6) and IP Version 4 (IPv4), thus allowing IP packets to be transferred between an IPv4 terminal and an IPv4 server connected to an IPv6 network. The IPv6-IPv4 conversion refers to an IP version conversion between an IPv6 packet for use in the IPv6 protocol and an IPv4 packet for use in the IPv4 protocol. An illustrative embodiment of the present invention is directed to a network technology consisting of multiple translators adapted to convert IP packets between the IPv6 and IPv4 protocol so as to allow the packets to be transferred between IPv4 terminals and IPv4 servers connected to an IPv6 network.

Figure 9:
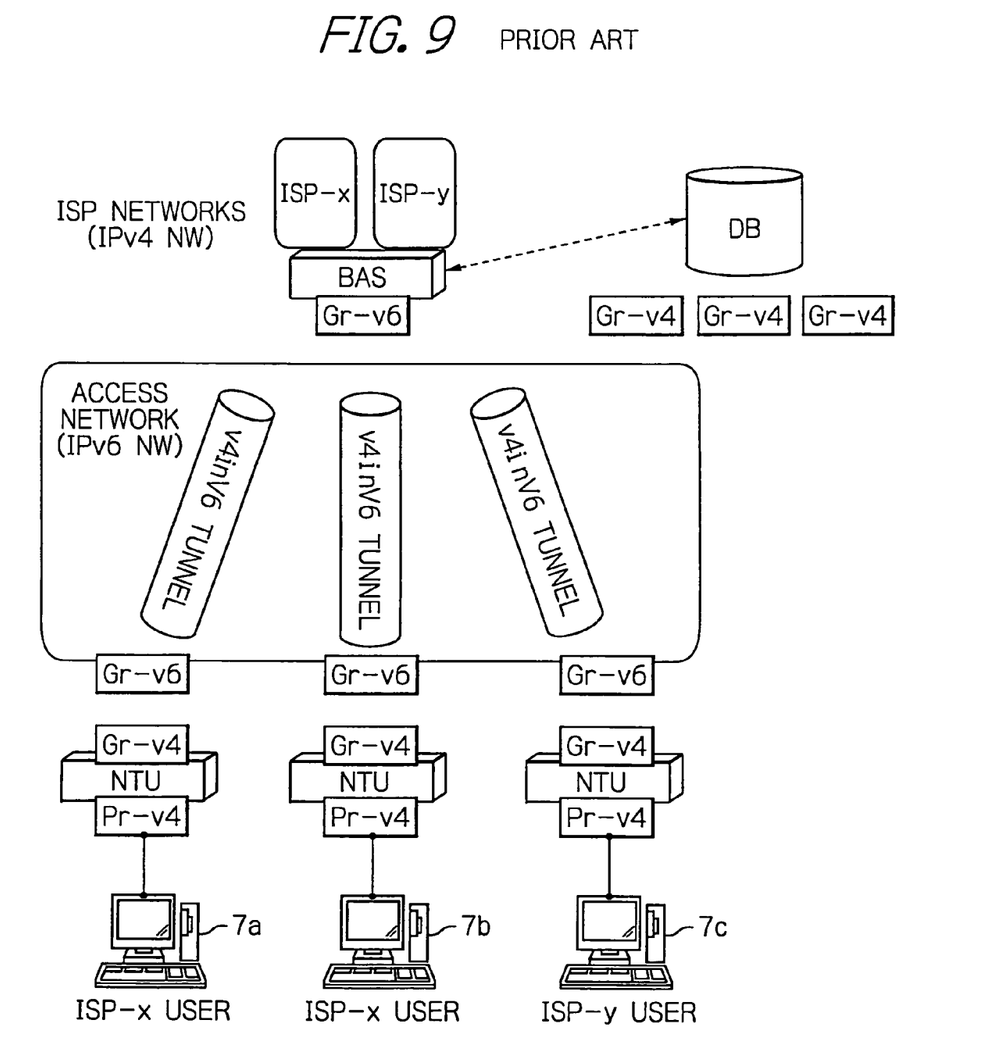
FIGS. 9 and 10 illustrate examples of the configuration of conventional telecommunications network systems in which IPv4 terminals and an IPv4 server are connected to an IPv6 network.

In order to clearly understand the present invention, conventional telecommunications network systems will be described prior to describing an illustrative embodiment of the invention. With reference to FIG. 9 first, in a telecommunications network system for communicating between different IP versions, IPv4 terminals and an IPv4 server are connected to an IPv6 access network (NW). The telecommunications network system shown performs packet transfer by using, so called Ipv4-in-IPv6 tunnel connection, or capsuling.

The telecommunications network system includes a broadband access server BAS serving as an IPv4 server owned by the access network. The broadband access server BAS is connected to two Internet service provider (ISP) networks, ISP-x and ISP-y, which are IPv4 networks. The providers provide users with services specific to the ISP networks. The broadband access server BAS owns a subscriber management database DB. The subscriber management database DB stores subscriber identifications (IDs) for identifying users and global IP addresses for IPv4 (Gr-v4) corresponding to terminal IPv4 user terminals 7a, 7b and 7c. Thus, the broadband access server BAS can manage users or subscribers enjoying services. The broadband access server BAS also owns a global IP address for IPv6 (Gr-v6) for use in connection to the IPv6 access network.

In the telecommunications network system, there are two types of user, ISP-x users using the ISP-x and an ISP-y user using the ISP-y. The ISP-x and ISP-y users use the IPv4 terminals 7a, 7b and 7c, respectively. In the system, there are three network terminal units NTU assigned to respective Gr-v4 addresses by the ISP networks. The IPv4 terminals are given respective private IP address for IPv4 (Pr-v4) and connected to corresponding one of the network terminal units. The network terminal units NTU are adapted to convert a Pr-V4 address obtained from the IPv4 terminal associated therewith to a Gr-v4 address for connection to the IPv6 access network. Over the IPv6 network, a tunnel connection is thus established between the respective network terminal units NTU and the broadband access server BAS. More specifically, the Pr-v4 address of the IPv4 terminals is converted to the Gr-v4 address of the network terminal units NTU, and the Gr-v4 address resultant from the conversion is capsuled into the Gr-v6 address to be tunneled.

Figure 10:
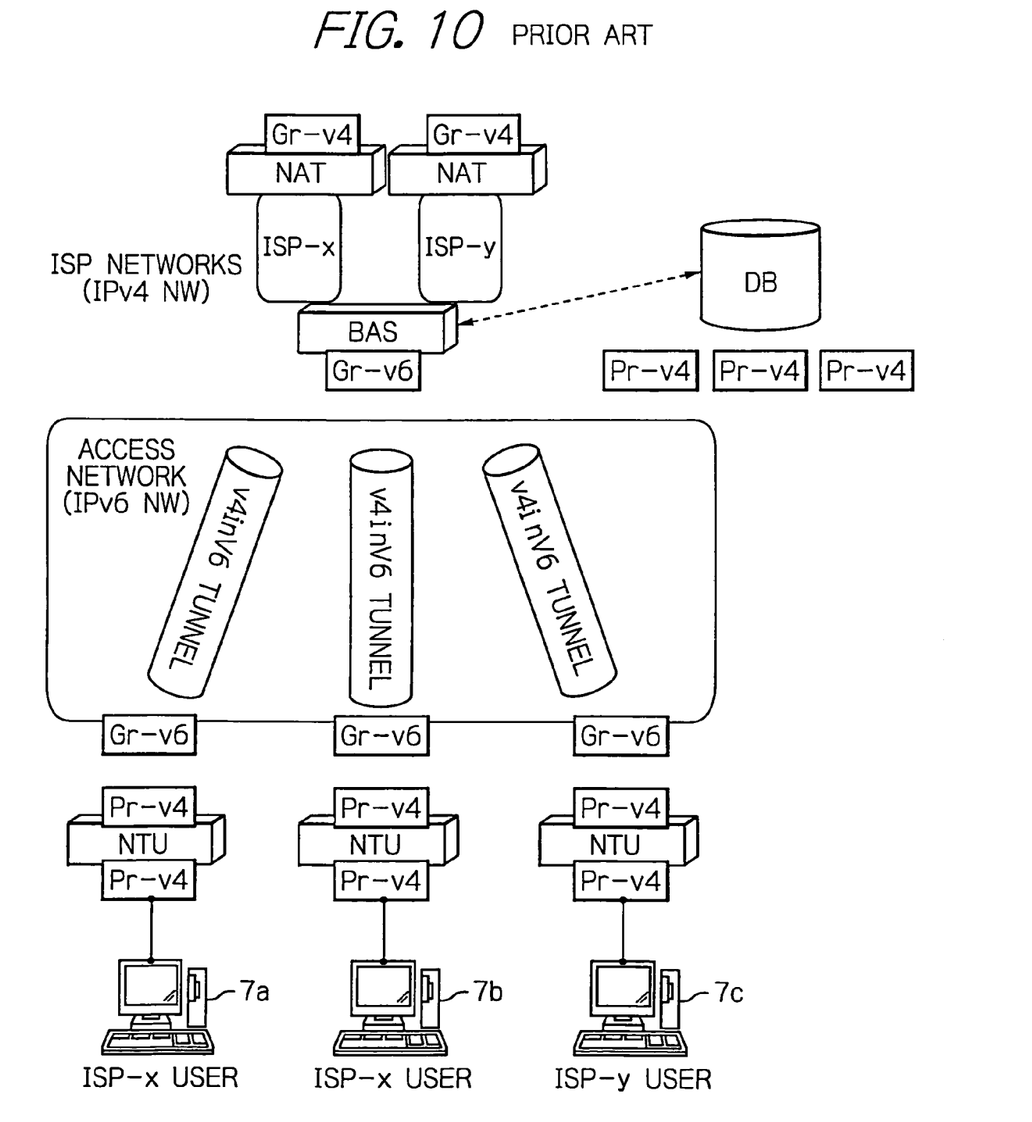

FIG. 10 illustrates another conventional telecommunications network system in which IPv4 terminals and an IPv4 server are connected to an IPv6 network. The system shown in the figure differs in configuration from the system shown in FIG. 9 in that on the upper level of the two ISP networks ISP-x and ISP-y placed are network application translation units NAT, each of which has a Pr-v4 address assigned by the ISP network associated therewith. The Pr-v4 address of the IPv4 terminals are converted to the Pr-v4 address of the network terminal units NTU, and the converted Pr-v4 addresses are capsuled into the Gr-v6 addresses and then tunneled, thus accomplishing a tunnel connection. Thus, the function of the network address translation units NAT allows the Gr-v4 address owned by the network address translation units NAT to support the IPv4 terminals 7a, 7b and 7c to which only the Pr-v4 addresses are assigned, thereby saving the resources of Gr-v4 addresses. In the network system, a subscriber management database DB stores subscriber identifications (IDs) to identify users and Pr-v4 addresses associated with the IPv4 terminals of the users.

Figure 1:
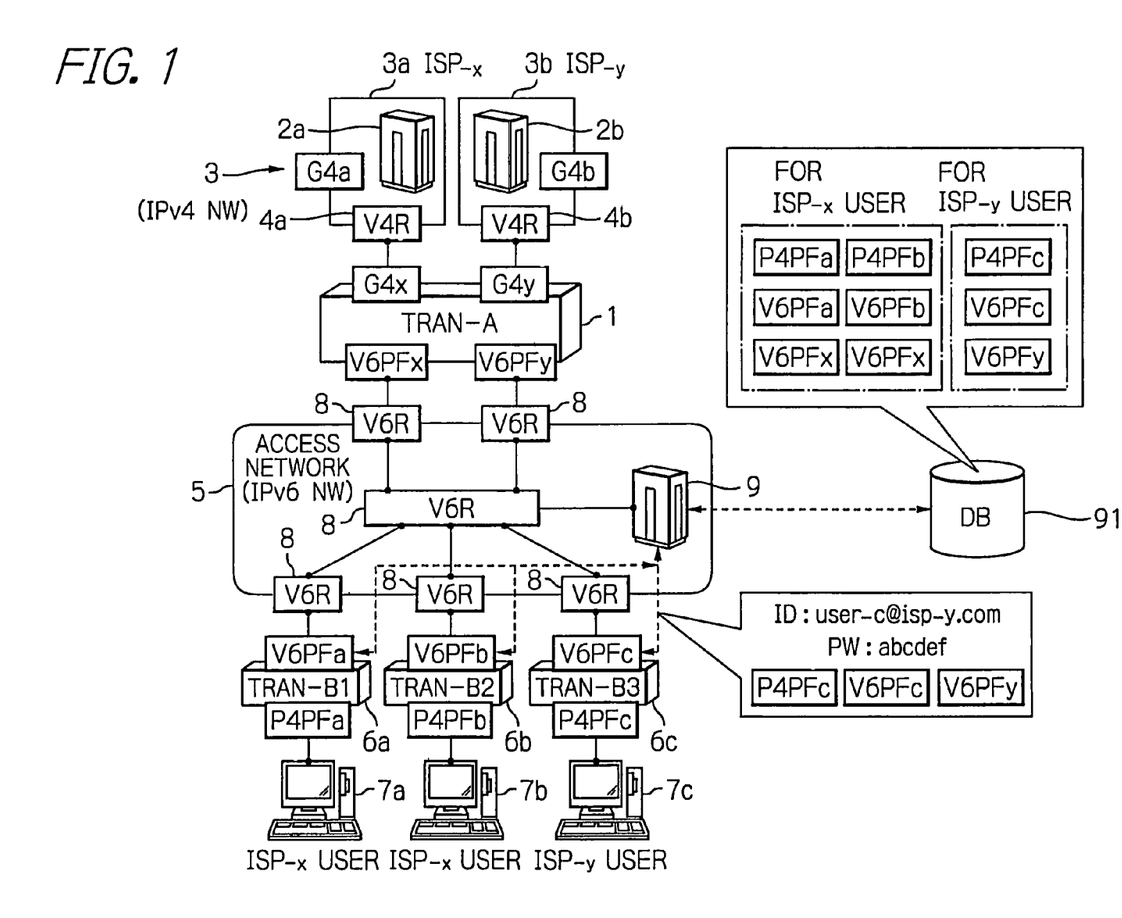
FIG. 1 schematically illustrates the configuration of a telecommunications network system having a V4-V6-V4 conversion access networks based upon the IPv6-IPv4 conversion according to an illustrative embodiment of the present invention.

Now, with reference to FIG. 1, a preferred embodiment of a telecommunications network system in accordance with the invention includes a V4-V6-V4 conversion access network based upon the IPv6-IPv4 conversion. With the illustrative embodiment, the network system includes a translator A (TRAN-A) 1 adapted for connecting ISP networks 3a and 3b to an access network 5. The ISP networks (NWs) 3a and 3b are IPv4 networks, ISP-x and ISP-y, respectively, and generally designated with a reference numeral 3. The access network 5 is an IPv6 network for use in the V4-V6-V4 conversion, which is a combination of V4-V6 conversion and V6-V4 conversion as will be described later on.

The translator A1 is given IPv4 global IP addresses G4x and G4y for the respective ISP networks 3a and 3b connected thereto. The addresses G4x and G4y are IPv4 global addresses corresponding to the networks IPS-x 3a and ISP-y 3b, respectively.

With the illustrative embodiment, the network system includes translators B1, B2 and B3 6a, 6b and 6c connected to IPv4 user terminals 7a, 7b and 7c for the ISP-x users and ISP-y user, respectively. Translators B1, B2 and B3 6a, 6b and 6c may generally be referred to as translator B 6. The IPv4 terminals 7a, 7b and 7c may also generally be referred to as IPv4 terminal 7.

The access network 5 includes IPv6 routers (V6R) 8. The ISP networks ISP-x 3a and ISP-y 3b include IPv4 routers (V4R) 4a and 4b, respectively, which are connected to IPv4 servers 2a and 2b owned by the providers. The IPv4 server 2a and 2b are given IPv4 global addresses G4a and G4b, respectively. The IPv4 routers (V4R) 4a and 4b may be generally referred to as IPv4 router (V4R) 4. The IPv4 servers 2a and 2b may be generally referred to as IPv4 server 2.

On the access network 5, a prefix management server 9 is placed to manage prefixes corresponding to the ISP networks to which the IPv4 terminals 7a, 7b and 7c of users belong. The prefix management server 9 has a prefix management database (DB) 91. The prefix management database 91 stores prefixes and other information associated with users, the prefixes and information being required when users send packets.

The translators B6 are adapted to communicate with the prefix management server 9 in order to obtain a prefix for the ISP networks 3a and 3b which users belong to. The translators B 6 hold information for identifying users, such as identifications (IDs) or personal identification codes, and passwords (PWs) associated therewith. The prefix management server 9 uses an identification and a password of a user to determine the ISP network 3a or 3b, to which the user belongs, to develop a prefix appropriate for the ISP network thus determined, the prefixes in turn being sent to the translator B6 for distribution.

For example, with respect to the IPv4 terminal 7c used by the ISP-y user, the translator B3 6c has an email address, user-c@isp-y.com, functioning as his/her identification and a string of letters, abcdef, functioning as his/her password stored in advance. The prefix management server 9 uses an email address, user-c@isp-y.com, and a letter string, abcdef, to identify the ISP-y server 3b to which the ISP-y user 7c belongs, and sends three prefixes appropriate therefor for distribution. Those prefixes are of the IPv4 private IP address (P4PFc) and the IPv6 address (V6PFc) given to the translator B3 6c, and of the IPv6 address (V6PFy) given to the translator A1 associated with the ISP-y server 2b.

FIG. 1 shows such prefixes. The prefixes V6PFx and V6PFy are of the IPv6 addresses allotted to the translator A 1, and correspond to the ISP-x and ISP-y networks 3a and 3b, respectively. According to the embodiment, each of the prefixes has its bit length corresponding to 96 bits.

The prefixes V6PFa, V6PFb and V6PFc are of the IPv6 addresses allotted to the translators B1, B2 and B3 6a, 6b and 6c, respectively, and correspond to the IPv4 terminals 7a, 7b and 7c. According to the embodiment, each of the three prefixes has its bit length also corresponding to 96 bits.

The prefixes P4PFa, P4PFb and P4PFc are of the IPv4 private addresses assigned to the translators B1, B2 and B3 6a, 6b and 6c, respectively, and correspond to the IPv4 terminals 7a, 7b and 7c.

Figure 2:
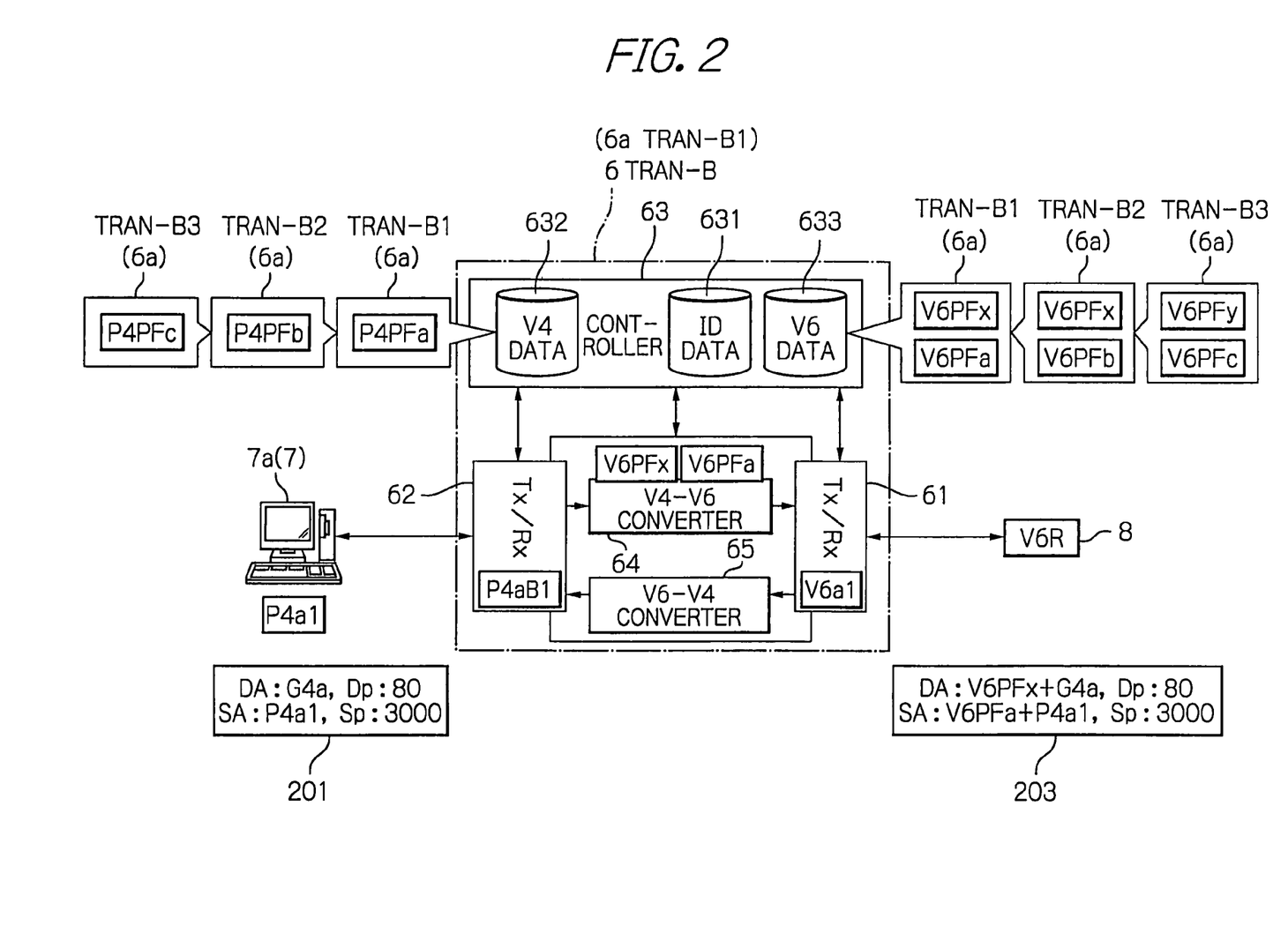
FIG. 2 schematically shows the functional configuration of a translator together with the elements associated therewith in the illustrative embodiment shown in FIG. 1.

The translators B1, B2 and B3 6a, 6b and 6c may be the same in basic configuration as each other. FIG. 2, therefore, representatively illustrates the functional configuration of translator B1 together with its peripheral elements or devices.

The translator B includes a transmitter/receiver (Tx/Rx) 61 connected to an IPv6 router (V6R) 8 given an IPv6 address V6a1 that is generated based on the prefix distributed from the IPv6 router (V6R) 8. Using this address V6a1, the transmitter/receiver 61 communicates with the prefix management server 9.

The translator 6 further includes a controller 63 which is adapted to systematically store and manage identification data 631, V4 data 632 and V6 data 633. The identification data 631 contains an identification for identifying the user of the IPv4 terminal 7a and a password which are set in advance according to the ISP network 3a, for example.

The V4 data 632 includes the prefix P4PFa of the IPv4 private address corresponding to the translator B1 6a and distributed from the prefix management server 9. The translator 6 includes another transmitter/receiver 62, which is connected to the IPv4 terminal 7a and is given the IPv4 private address P4aB1 that is generated based on the prefix P4PFa. The private address P4aB1 is an address assigned to the translator B1 6a. FIG. 2 also shows an address P4a1 which is the IPv4 private address assigned to the IPv4 terminal 7a. The V4 data for the translator B2 6b includes the prefix P4PFb of the IPv4 private address. The V4 data for the translator B3 6c contains the prefix P4PFc of the IPv4 private address.

The V6 data 633 contains the prefixes V6PFx and V6PFa of the IPv6 address corresponding to the translator B1 6a and distributed from the prefix management server 9. The V6 data 633 contains the prefixes V6PFx and V6PFa of the IPv6 address used in a V4-V6 converter 64. The V6 data for the translator B2 6b contains the prefixes V6PFx and V6PFb of the IPv6 address. The V6 data for the translator B3 6c contains the prefixes V6PFy and V6PFc of the IPv6 address.

The V4-V6 converter 64 executes the V4-V6 conversion on IPv4 packets 201 received from the IPv4 terminal 7a for producing IPv6 packets 203. The V4-V6 conversion refers to a process in which the prefix of the IPv6 address is added to an IPv4 packet 201, thus converting the IPv4 packet 201 to an IPv6 packet 203.

The translator 6 includes a V6-V4 converter 65 adapted to perform V6-V4 conversion on an IPv6 packet 203 received from IPv6 router (V6R) 8 to generate an IPv4 packet 201. The V6-V4 conversion refers to a conversion from an IPv6 packet 203 to an IPv4 packet 201 by removing an IPv6 address prefix that is contained in the IPv6 packet 203.

Figure 3:
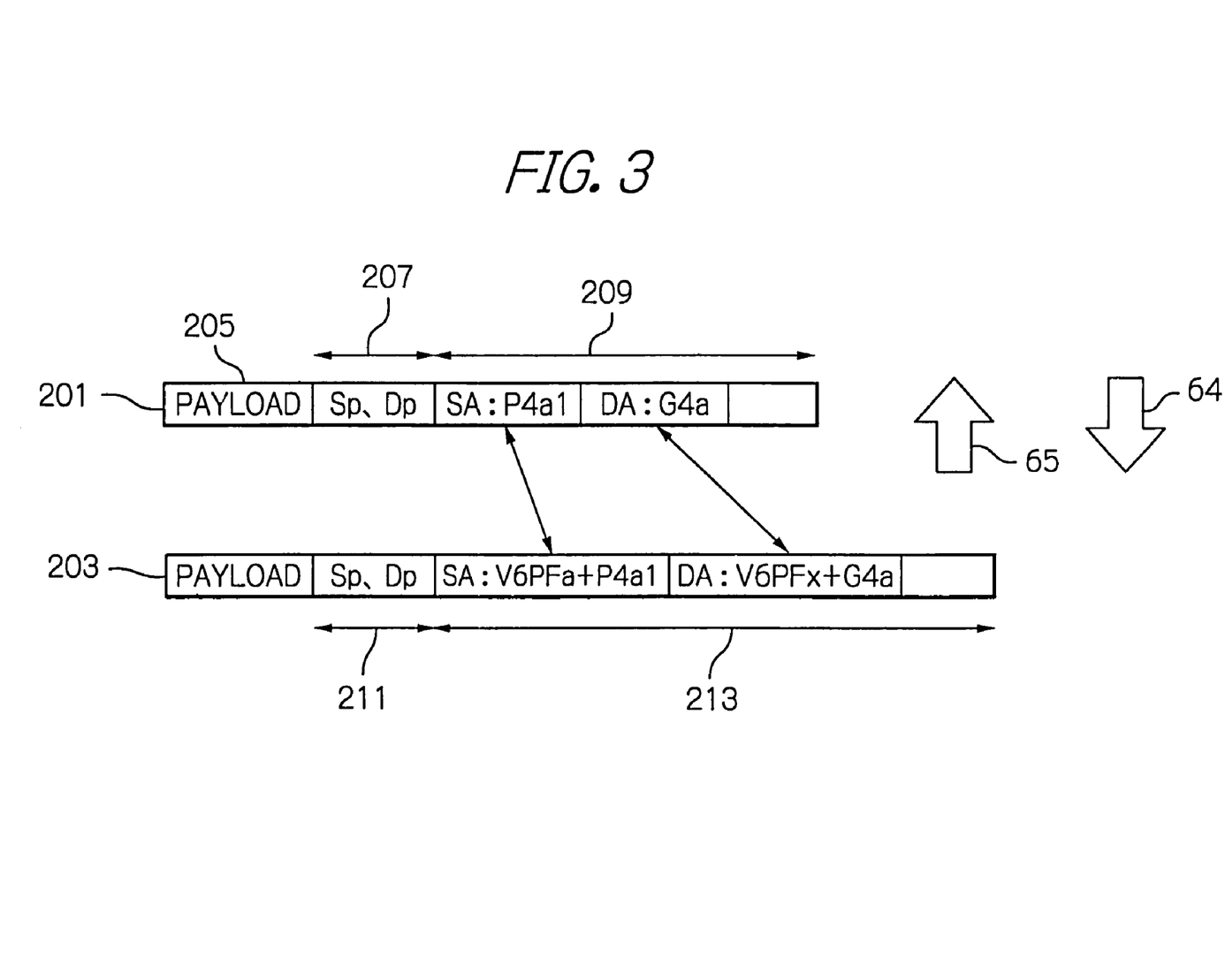
FIG. 3 schematically illustrates an example of data structure of IPv4 and IPv6 packets for use in the embodiment.

Now, reference will be made to FIG. 3, which illustrates the data structure of an IPv4 packet 201 and an IPv6 packet 203. The IPv4 packet 201 consists of a payload field 205 containing data per se, a TCP (Transmission Control Protocol)/UDP (User Datagram Protocol) header 207 containing a sender port number Sp and a destination port number Dp, and an IPv4 header 209 containing a sender address SA and a destination address DA. The IPv6 packet 203 consists of a payload field storing data per se, a TCP/UDP header 211 containing a sender port number Sp and a destination port number Dp, and an IPv6 header 213 containing a sender address SA and destination address DA.

The V4-V6 converter 64, as shown in FIG. 2, functions as adding the 96 bits of prefix V6PFa to the sender address SA containing the 32 bits of IPv4 private address P4a1 of the IPv4 packet 201 to thereby produce a 128 bit IPv6 address (V6PFa+P4a1). In addition, the V4-V6 converter 64 adds the 96 bits of prefix V6PFx to the destination address DA containing the 32 bits of IPv4 global address G4a of the IPv4 packet 201 to thereby produce a 128 bit IPv6 address (V6PFx+G4a). Using the two IPv6 addresses V6PFa+P4a1 and V6PFx+G4a thus produced, the IPv6 packet 203 is produced, the IPv4 header 209 being thus converted to the corresponding IPv6 header 213, as depicted with an arrow 64 in FIG. 3.

The V6-V4 converter 65, as shown in FIG. 2, functions as removing the 96 bits of prefix V6PFa from the sender address SA containing the 128 bits of IPv6 address (V6PFa+P4a1) of the IPv6 packet 203 to thereby produce the 32 bits of IPv4 private address P4a1. In addition, the V6-V4 converter 65 removes the 96 bits of prefix V6PFx from the destination address DA containing the 128 bits of IPv6 address (V6PFx+ G4a) of the IPv6 packet 203 to thereby produce a 32 bit global address G4a. Using the two IPv4 addresses P4a1 and G4a thus produced, the IPv4 packet 201 is produced, the IPv6 header 213 being thus converted to the IPv4 header 209, as depicted with another arrow 65 in FIG. 3.

Figure 4:
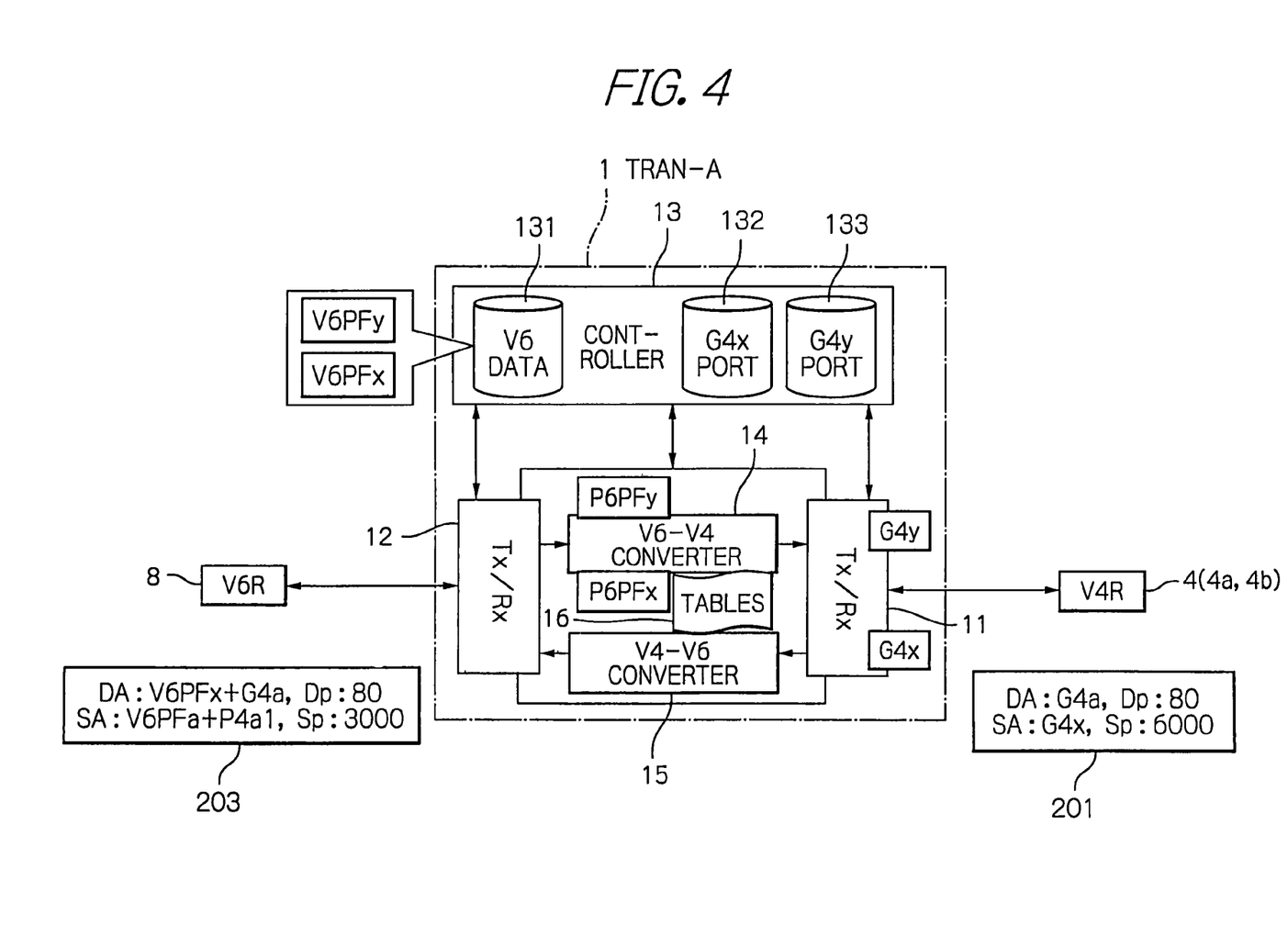
FIG. 4 schematically illustrates, like FIG. 2, the functional configuration of another translator together with the elements associated therewith in the embodiment.

With reference to FIG. 4, the functional configuration of the translator A1 will be described in connection with its peripheral elements. The transmitter/receiver 11 connected to the IPv4 router (V4R) 4 is given in advance the IPv4 global addresses G4x and G4y. The other transmitter/receiver 12 connected to the IPv6 router (V6R) 8 receives IPv6 packets 203.

The controller 13 systematically stores and manages the V6 datA131, G4x port 132 and G4y port 133. The V6 data 131 contains the prefixes V6PFx and V6PFy of the IPv6 address corresponding to the ISP-x and ISP-y servers 3a and 3b, respectively. Those prefixes are obtained from the prefix management server 9.

The G4x port 132 and G4y port 133 are port pools that store port numbers for executing the NAPT (Network Address Port Translation) conversion by the V6-V4 converter 14 and the V-V6 converter 15, as will be described later.

The V6-V4 converter 14 executes the V6-V4 conversion on IPv6 packets 203 received from the IPv6 router (V6R) 8, thereby producing IPv4 packets 201. The V4-V6 converter 15 executes the V4-V6 conversion on IPv4 packets 201 received from the IPv4 router (V4R) 4, thereby producing IPv6 packets 203. The V6-V4 and V4-V6 converters 14 and 15 share and store conversion tables 16, disclosed below FIG. 5. The V6-V4 and V4-V6 conversions are executed according to the data stored in the tables 16.

Figure 5:
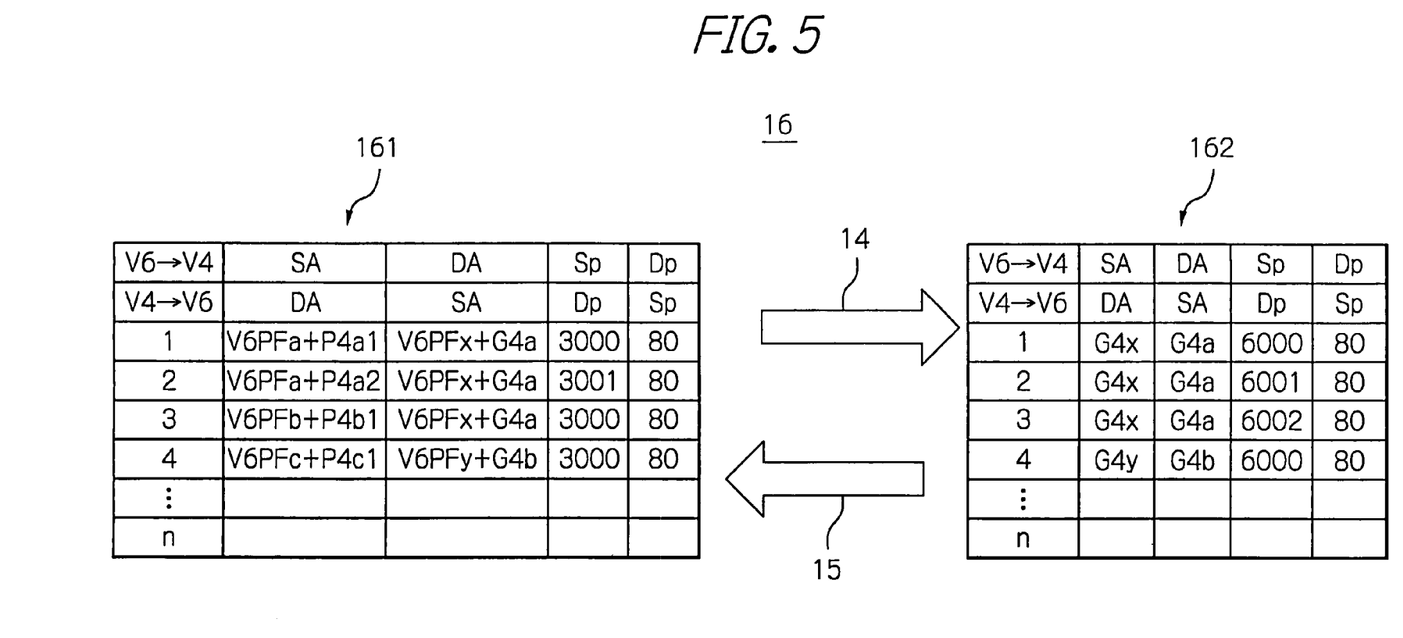
FIG. 5 illustrates an example of detailed data structure of conversion tables.

FIG. 5 details the data structure of the conversion tables 16. The conversion tables 16 consist of conversion tables 161 and 162, each of which has data fields such as sender address SA, destination address DA, sender port number Sp and destination port number Dp of a packet of interest. For an IP address of interest, when a sender address SA is registered for the V6-V4 conversion (V6->V4 in the figure), it will also be registered as a destination address DA for the V4-V6 conversion (V4->V6 in the figure). For a port number of interest, when a sender port number Sp is registered, it will also be registered as a destination port number Dp for the V4-V6 conversion. Such a duality relation exists between the addresses and port numbers.

Depending on the direction of conversion, i.e. the V6-V4 or V4-V6 conversion, the conversion tables 161 and 162 function as either of identification and action tables. The identification table is a conversion table to identify a packet received. The action table is another conversion table to identify a packet to be sent. To "identify" a packet means to specify the sender address SA, destination address DA, sender port number Sp and destination port number Dp of that packet.

The conversion table 16 consists of records, which are dynamically registered in response to an IPv6 packet received from the IPv6 router (V6R) 8 and functioning as a trigger for establishing a connection, e.g. a SYN packet in the TCP protocol. In this case, the conversion tables 161 and 162 work as the identification and action tables, respectively. Depending on which of the prefixes V6PFx and V6PFy a received IPv6 packet holds, either of the addresses G4x and G4y is selected, or identified, to be registered in the field of sender address SA in the row V6->V4 on the conversion table 162. In addition, from one of the port pools G4x port 132 and G4y port 133, as shown in FIG. 4, which corresponds to the address G4x or G4y thus selected, a sender port number is obtained and registered in the field of sender port number Sp in the row V6->V4 on the conversion table 162.

When an IPv4 packet is returned from the IPv4 router IPv4 router 4 as a response to an IPv6 packet received, the V4-V6 converter 15 searches the conversion table 162 as the identification table and uses the conversion table 161 as the action table to convert the IPv4 packet to an IPv6 packet. When converting, a prefix is selected, or identified, from the V6 datA131 and is incorporated into the IPv4 header of the IPv4 packet.

On the conversion tables 16 thus functioning as stated above, information is recorded or registered through the processing sequences described later on.

The V4-V6 -V4 conversion according to the embodiment will now be described. The description will specifically be focused on how the IP address and port number changes which are contained in a packet transferred between the IPv4 terminals and IPv4 server.

Figure 6:
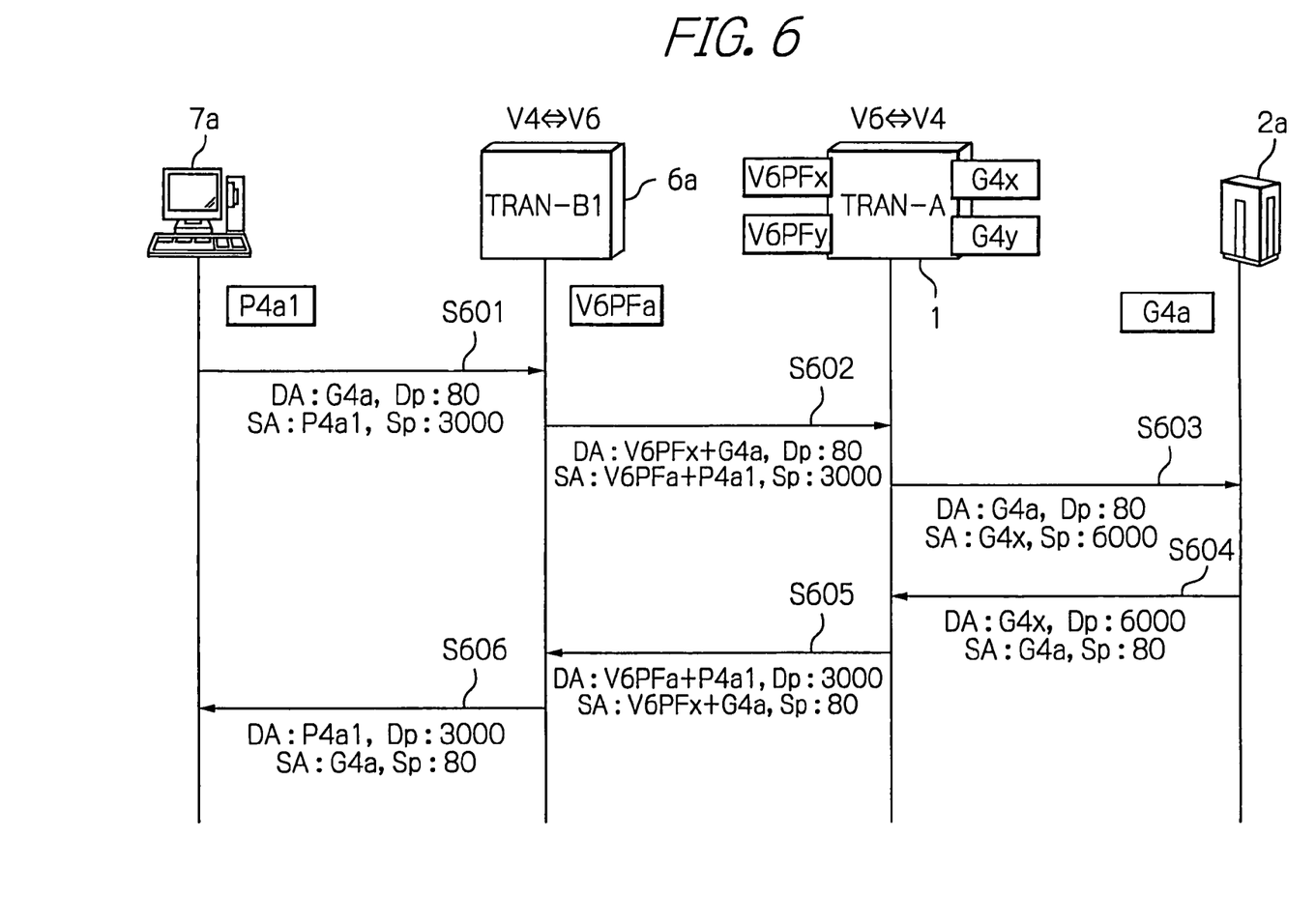
FIGS. 6, 7 and 8 are sequence charts useful for understanding how the V4-V6-V4 conversion proceeds on the respective IPv4 terminals in the network system shown in FIG. 1.

FIG. 6 illustrates the V4-V6-V4 conversion sequence with the IPv4 terminal 7a focused. At first, in step S601, an IPv4 packet 201 is sent to the translator B1 6a from the IPv4 terminal 7a which is given an IPv4 private address P4a1. This IPv4 packet 201 has its IPv4 header 209 specifying the address G4a in the destination address DA and the address P4a1 in the sender address SA. In the TCP/UDP header, the destination port number Dp is specified as "80" and the sender port number Sp as "3000". After the transmission, the procedure goes to step S602.

Then, in step S602, the IPv≠packet 203 is sent from the translator B1 6a to the translator A1. The IPv4 packet 201 received by the translator B1 6a is converted to an IPv6 packet 203 by the V4-V6 converter 64. In the IPv6 header 213 of this IPv6 packet 203, the prefix V6PFx of the translator A1 is used to specify the destination address DA as V6PFx+G4a, and the prefix V6PFa of the translator B1 6a is used to specify the sender address SA as V6PFa+P4a1. In the TCP/UDP header 211, the destination port number Dp is specified as "80" and the sender port number Sp is specified as "3000". After the transmission, the procedure goes to step S603.

Then in step S603, the IPv4 packet 201 is sent from the translator A1 to the IPv4 server 2a which is given an IPv4 global address G4a. The IPv6 packet 203 received by the translator A1 is converted to an IPv4 packet 201. For the conversion, the V6-V4 converter 14 at first identifies the IPv6 packet 203 received, and establishes its record, when identified, on the conversion table 161. The record will be what is shown in the row "1" in the conversion table 161 in FIG. 5. Then, from the controller 13, the port number, stored in the G4x port 132 in this case, is obtained and a record using the port number is registered on the conversion table 162. The record will be what is shown in the row "1" in the conversion table 162 in FIG. 5. The IPv4 packet 201 thus produced in the above-stated manner has its IPv4 header 209 specifying the destination address DA as G4a and the sender address SA as G4x. The TCP/UDP header 207 specifies the destination port number Dp as "80" and the sender port number Sp as "6000". After the transmission, the procedure goes to step S604.

In step S604, an IPv4 packet 201 is sent as a response from the IPv4 server 2a to the translator A1. In this IPv4 packet

201, its IPv4 header 209 specifies the destination address DA as G4x and the sender address SA as G4a. The TCP/UDP header 207 specifies the destination port number Dp as "60001" and the sender port number Sp as "80". After the transmission, the procedure goes to step S605.

Then, in step S605, the IPv6 packet 203 is sent from the translator A1 to the translator B1 6a. The IPv4 packet 201 received by the translator A1 is converted to an IPv6 packet 203. For the conversion, the V4-V6 converter 15 at first uses the conversion table 162 to identify the IPv4 packet 201 received into, in this case, a record numbered "1" shown in FIG. 5. Then, the IPv6 packet 203, corresponding to the IPv4 packet 201 thus identified, is read out from the conversion table 161, in this case, as a record numbered "1" shown in FIG. 5, and assembled into an IPv6 packet 203 thus read out. In the IPv6 packet 203 generated in this manner, the IPv6 header 213 specifies the destination address DA as V6PFa+P4a1, and the sender address SA as V6PFx+G4a. The TCP/UDP header 211 specifies the destination port number Dp as "3000" and the sender port number Sp as "80". After the transmission, the procedure goes to step S606.

Then in step S606, the IPv4 packet 201 is sent from the translator B1 6a to the IPv4 terminal 7a. The IPv6 packet 203 received by the translator B1 6a is converted to an IPv4 packet 201 by the V6-V4 converter 65. In the IPv4 header 209 of this IPv4 packet 201, the prefix V6PFa of the translator B1 6a is removed with the destination address DA specified as P4a1, as well as the prefix V6PFx of the translator A1 is removed with the sender address SA specified as G4a. In the TCP/UDP header 207, the destination port number Dp and the sender port number Sp are specified as "3000" and "80", respectively. The sequence on the IPv4 terminal 7a has thus concluded.

Figure 7:
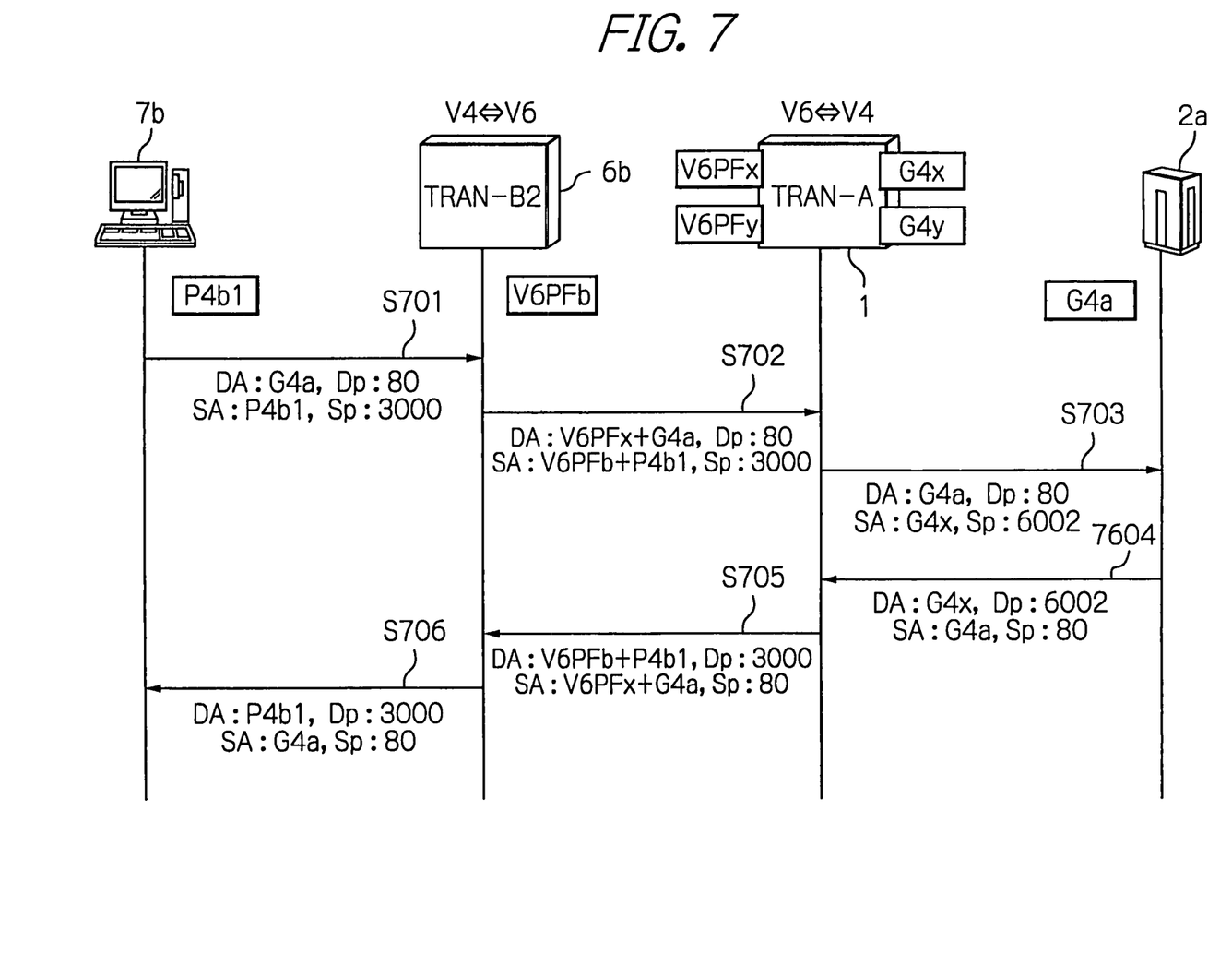

Reference will be made to FIG. 7 illustrating how the V4-V6 -V4 conversion proceeds with the IPv4 terminal 7b focused. At first, in step S701, an IPv4 packet 201 is sent from the IPv4 terminal 7b having its IPv4 private address P4b1 assigned to the translator B2 6b. In this IPv4 packet 201, the IPv4 header 209 specifies the destination address DA as G4a and the sender address SA as P4b1. The TCP/UDP header 207 specifies the destination port number Dp as "80" and the sender port number Sp as "13000". After the transmission, the procedure goes to step S702.

Then in step S702, the IPv6 packet 203 is sent from the translator B1 6a to the translator A1. The IPv4 packet 201 received by the translator B1 6a is converted to an IPv6 packet 203 by the V4-V6 converter 64. In respect of the IPv6 header 213 of this IPv6 packet 203, the prefix V6PFx of the translator A1 is used to specify the destination address DA as V6PFx+G4a, and the prefix V6PFb of the translator B2 6b is used to specify the sender address SA as V6PFb+P4b1. In the TCP/UDP header 211, the destination port number Dp and sender port number Sp as "80" and "3000", respectively. After the transmission, the procedure goes to step S703.

Then, in step S703, the IPv4 packet 201 is sent from the translator A1 to the IPv4 server 2a that is given the IPv4 global address G4a. The IPv6 packet 203 received by the translator A1 is converted to an IPv4 packet 201. In the conversion, the V6-V4 converter 14 identifies at first an IPv6 packet 203 received, and registers the record, when identified, onto the conversion table 161, as exemplified on the record numbered "3" shown in FIG. 5. Then, from the controller 13, a port number, in this case stored in the G4x port 132, is taken out and used to register the record on the conversion table 162, as exemplified on the record numbered "3" shown in FIG. 5. In the IPv4 packet 201 produced in the above-described manner, the IPv4 header 209 specifies the destination address DA as G4a, and the sender address SA as G4x. In the TCP/UDP header 207, the destination port number Dp and sender port number Sp are specified as "80", and "6002", respectively. After the transmission, the procedure goes to step S704.

Then, in step S704, the IPv4 packet 201 is sent as a response from the IPv4 server 2a to the translator A1. In its IPv4 header 209 of this IPv4 packet 201, the destination address DA and sender address SA are specified as G4x and G4a, respectively. The TCP/UDP header 207 specifies the destination port number Dp and sender port number Sp as "6002" and "80", respectively. After the transmission, the procedure goes to step S705.

Then in step S705, the IPv6 packet 203 is sent from the translator A1 to the translator B2 6b. The IPv4 packet 201 received by the translator A1 is converted to an IPv6 packet 203. In the conversion, the V4-V6 converter 15 at first uses the conversion table 162 to identify the IPv4 packet 201 received, as shown, in this case, as a record numbered "3" in FIG. 5). Then, the IPv6 packet 203 corresponding to the identified IPv4 packet 201 is read out from the conversion table 161, as the exemplified record numbered "3" in this case shown in FIG. 5, and assembled into an IPv6 packet 203 that is read out. In the IPv6 packet 203 produced in this manner, the IPv6 header 213 specifies the destination address DA as V6PFb+P4b1, and the sender address SA as V6PFx+G4a. The TCP/UDP header 211 specifies the destination port number Dp and sender port number Sp as "3000" and "80", respectively. After the transmission, the procedure goes to step S706.

Then, in step S706, the IPv4 packet 201 is sent from the translator B2 6b to the IPv4 terminal 7b. The IPv6 packet 203 received by the translator B2 6b is converted to an IPv4 packet 201 by the V6-V4 converter 65. In the IPv4 header 209 of this IPv4 packet 201, the prefix V6PFb of the translator B2 6b is removed therefrom with the destination address DA identified as P4b1, and the prefix V6PFx of the translator A 1 is removed with the sender address SA identified as G4b. The TCP/UDP header 207 identifies the destination port number Dp and sender port number Sp as "3000" and "80", respectively. The sequence in connection with the IPv4 terminal 7b has thus concluded.

Figure 8:
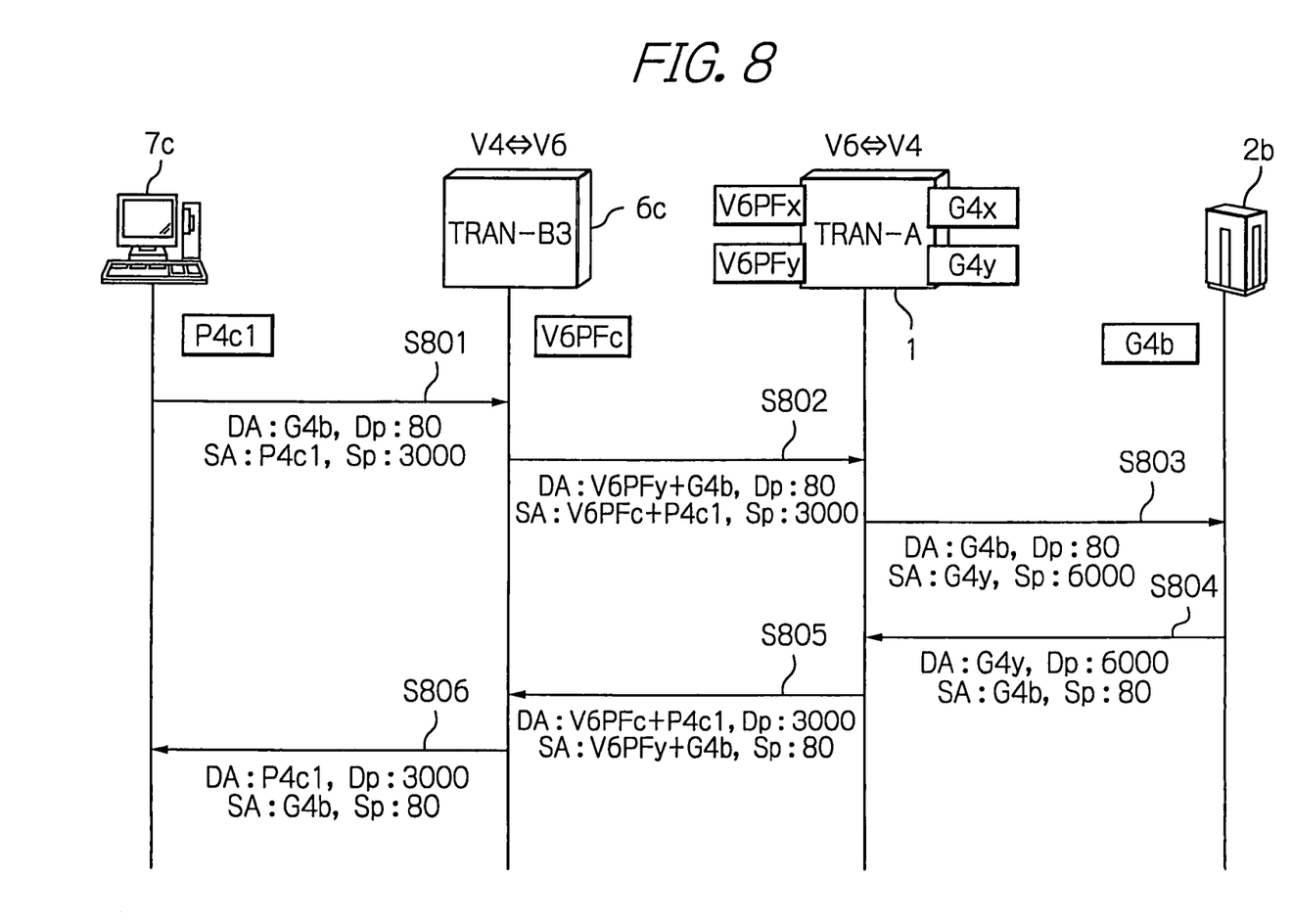

Finally, with reference to FIG. 8, the V4-V6 -V4 conversion sequence will be described when focusing on the IPv4 terminal 7c. At first in step S801, an IPv4 packet 201 is sent from the IPv4 terminal 7c having its IPv4 private address P4c1 allotted to the translator B3 6c. In the IPv4 header 209 of this IPv4 packet 201, the destination address DA and sender address SA are specified as G4b and P4c1, respectively. The TCP/UDP header 209 specifies the destination port number Dp and sender port number Sp as "80" and "3000", respectively. After the transmission, the procedure goes to step S802.

In step S802, the IPv6 packet 203 is sent from the translator B3 6c to the translator A1. The IPv4 packet 201 received by the translator B3 6c is converted to the IPv6 packet 203 by the V4-V6 converter 64. In this IPv6 packet 203, the IPv6 header 213 specifies the destination address DA as V6PFy+G4b by means of the prefix V6PFy of the translator A1, and the sender address SA as V6PFc+P4c1 by means of the prefix V6PFc of the translator B3 6c. The TCP/UDP header 211 specifies the destination port number Dp and sender port number Sp as "80" and "3000", respectively. After the transmission, the procedure goes to step S803.

In step S803, the IPv4 packet 201 is sent from the translator A1 to the IPv4 server 2b having its IPv4 global address G4b assigned. The IPv6 packet 203 received by the translator A1 is converted to an IPv4 packet 201. In the conversion, the V6-V4 converter 14 at first identifies the IPv6 packet 203 received and registers that record, when identified, onto the conversion table 161, as exemplified as the record numbered "4" shown in FIG. 5. Then, the controller 13 takes out a port number, stored in the G4y port 133 in this case, and registers a record using the port number thus obtained onto the conversion table 162, as exemplified as the record numbered "4" shown in FIG. 5. The IPv4 header 209 of the IPv4 packet 201 generated in this manner specifies the destination address DA and sender address SA as G4b and G4y, respectively. The TCP/UDP header 207 specifies the destination port number Dp and sender port number Sp as "90" and "6000", respectively. After the transmission, the procedure goes to step S804.

Then in step S804, the IPv4 packet 201 is sent as a response from the IPv4 server 2b to the translator A1. The IPv4 header 209 of this IPv4 packet 201 specifies the destination address DA and sender address SA as G4y and G4b, respectively. The TCP/UDP header 207 specifies the destination port number Dp and sender port number Sp as "6000" and "80", respectively. After the transmission, the procedure goes to step S805.

Then in step S805, the IPv6 packet 203 is sent from the translator A1 to the translator B36c. The IPv4 packet 201 received by the translator A1 is converted to an IPv6 packet 203. When converted, the V4-V6 converter 15 at first uses the conversion table 162 to identify the IPv4 packet 201, as in this case the record numbered "4" shown in FIG. 5. Then, the IPv6 packet 203 corresponding to the IPv4 packet 201 identified is read out from the conversion table 161, as exemplified as the record numbered "4" shown in FIG. 5 in this case, being assembled into an IPv6 packet 203 that is read out. In the IPv6 packet 203 generated in this manner, the IPv6 header 213 identifies the destination address DA and sender address SA as V6PFc+P4c1 and V6PFy+G4b, respectively. The TCP/UDP header 211 identifies the destination port number Dp and sender port number Sp as "3000" and "80", respectively. After the transmission, the procedure goes to step S806.

Then in step S806, the IPv4 packet 201 is sent from the translator B36c to the IPv4 terminal 7c. The IPv6 packet 203 received by the translator B1 6c is converted to an IPv4 packet 201 by the V6-V4 converter 65. In the IPv4 header 209 of this IPv4 packet 201, the prefix V6PFc of the translator B36c is removed therefrom with the destination address DA specified as P4c1, and the prefix V6PFy of the translator A 1 is removed with the sender address SA specified as G4b. The TCP/UDP header 207 specifies the destination port number Dp and sender port number Sp as "3000" and "80", respectively. The sequence in connection with the IPv4 terminal 7c has thus concluded.

In summary, the illustrative embodiment provides the following advantages. In place of a separate protocol or the like for capsuling as used conventionally, two or multiple stages of translators are provided to add and remove prefixes to and from the addresses contained in an IP packet, thus minimizing the reduction in effective transfer bandwidth compared with the conventional method. Thus, the network transfer efficiency with the IPv6-IPv4 conversion in use can be increased.

Compared with the addition of headers by the conventional capsuling, the addition of prefixes to addresses can suppress the MTU from being exceeded with fragments minimized. As a result, the network transfer efficiency can be prevented from reduction due to the IPv6-IPv4 conversion.

Unlike the conventional method, no ALG processing is executed, thus causing no loads accordingly. As a result, the network transfer efficiency can be enhanced through the IPv6-IPv4 conversion.

While the present invention has been described with reference to the particular preferred embodiment, it is not to be restricted by the embodiment. It is to be appreciated that those skilled in the art can change or modify the embodiments without departing from the scope and spirit of the present invention.

For example, the illustrative embodiment includes only one IPv6 access network 5 that is placed between the IPv4 terminals 7 and the IPv4 servers 2. In a telecommunications network system including multiple IPv6 networks between which IPv4 networks exist, it is satisfactory to place two translators equivalent to the translators A and B between the IPv4 and IPv6 networks to carry out the V4-V6-V4 conversion in between.

In the illustrative embodiment, the IPv4 terminals are assigned to IPv4 private addresses. It is also satisfactory to assign IPv4 global addresses to the IPv4 terminals.

In the illustrative embodiment, the translator A1 may be adapted to perform the NAT (Network Address Translation) conversion rather than the NAPT conversion.

Details of the form of configuration such as hardware, software and control sequences may be varied as far as the spirit and scope of the present invention would not deviate.

The entire disclosure of Japanese patent application No. 2008-148821 filed on Jun. 6, 2008, including the specification, claims, accompanying drawings and abstract of the disclosure, is incorporated herein by reference in its entirety.

What I claim is:

1. A telecommunications network system comprising:
   a user terminal working under a first version of Internet protocol (IP);
   a server placed on a first IP network working under the first version;
   a second IP network working under a second version of the Internet protocol to be communicable with said user terminal and said server;
   a first translator for connecting said user terminal to said second IP network;
   a second translator for connecting said server to said second IP network; and
   a prefix management server placed on said second IP network, and being configured to store and manage both a first prefix for a first address of the user terminal and a second prefix for a first address of the server for converting the first addresses to the second version thereof, for respective links between the user terminal and the first IP network to be connected in association with each other, the first prefix being developed for the user terminal and being assignable to said first translator to which said user terminal is connected for translating the first address of the user terminal to the second version thereof, and the second prefix being developed for the first IP network and being assignable to said second translator to which said first IP network is connected for translating the first address of the server to the second version thereof,
   said first translator comprising a first converter for attaching the first prefix obtained from said prefix management server to the first address of said user terminal, when acting as a sender, the first address being contained in a first packet of the first version received from said user terminal, and attaching the second prefix obtained from said prefix management server to the first address of said server, when acting as a destination, to thereby convert the first packet to a second packet of the second version,
   said second translator comprising a second converter for analyzing the second packet received from said first translator to identify the first address corresponding to said first IP network from the second prefix contained in the second packet, and specifying the identified first address as a sender address contained in the first packet to be sent to said server to thereby convert the second packet to the first packet.

2. The system in accordance with claim 1, wherein said second translator further comprises a third converter for analyzing the first packet received from said server to identify the second prefix from the first address contained in the first packet and corresponding to said first IP network, adding the identified second prefix to the first address of said server, and specifying the first address containing the identified second prefix as a sender address contained in the first packet to be sent to said first translator to thereby convert the first packet to the second packet,     said first translator further comprising a fourth converter for removing the second prefix contained in the second packet received from said second translator and added to the first address of said server acting as the sender, and removing the first prefix attached to the first address of said user terminal acting as the destination to thereby convert the second packet to the first packet.

3. The system in accordance with claim 1, wherein the first version is Version 4 of the Internet protocol, and the second version is Version 6 of the Internet protocol.

4. The system in accordance with claim 2, wherein said second translator stores a conversion table which is used when said second converter converts the second packet to the first packet and when said third converter converts the first packet to the second packet, the conversion table being shared by said second converter and said third converter,     the conversion table storing the sender address in association with the destination address, the sender address and the destination address being contained in the second packet before being converted by said second converter and in the second packet after being converted by said third converter,     the conversion table further storing the sender address in association with the destination address, the sender address and the destination address being contained in the first packet after being converted by said second converter and in the first packet before being converted by said third converter.

5. A telecommunications network system comprising:
a user terminal working under a first version of Internet protocol (IP);
a server placed on a first IP network working under the first version;
a second IP network working under a second version of the Internet protocol to be communicable with said user terminal and said server;
a first translator for connecting said user terminal to said second IP network;
a second translator for connecting said server to said second IP network; and
a prefix management server placed on said second IP network, and being configured to store and manage both a first prefix for a first address of the user terminal and a second prefix for a first address of the server for converting the first addresses to the second version thereof, for respective links between the user terminal and the first IP network to be connected in association with each other, the first prefix being developed for the user terminal and being assignable to said first translator to which said user terminal is connected for translating the first address of the user terminal to the second version thereof, and the second prefix being developed for the first IP network and being assignable to said second translator to which said first IP network is connected for translating the first address of the server to the second version thereof,
said second translator comprising a first converter for analyzing a first packet of the first version received from said server to identify the second prefix from the first address contained in the first packet and corresponding to said first IP network, adding the identified second prefix to the first address of said server, and specifying the first address containing the identified second prefix as a sender address contained in the first packet to be sent to said first translator to thereby convert the first packet to a second packet of the second version,
said first translator comprising a second converter for removing the second prefix contained in the second packet received from said second translator and added to the first address of said server acting as the sender, and removing the first prefix attached to the first address of said user terminal acting as the destination to thereby convert the second packet to the first packet.

6. The system in accordance with claim 5, wherein the first version is Version 4 of the Internet protocol, and the second version is Version 6 of the Internet protocol.

7. The system in accordance with claim 1, further comprising a router within the second IP network connected to the first translator and the second translator and configured to receive the first prefix and the second prefix from the prefix management server.

8. The system in accordance with claim 5, further comprising a router within the second IP network connected to the first translator and the second translator and configured to receive the first prefix and the second prefix from the prefix management server.

9. The system in accordance with claim 1, wherein the prefix management server uses an identification or a password of a user to develop the first prefix or the second prefix.

10. The system in accordance with claim 5, wherein the prefix management server uses an identification or a password of a user to develop the first prefix or the second prefix.

\* \* \* \* \*